Jan. 14, 1969   L. J. HOBBS   3,421,604
DISC BRAKE ACTUATING PISTON ADJUSTING MEANS
Filed May 15, 1967

INVENTOR
LEONARD J. HOBBS
BY Cushman, Darby & Cushman
ATTORNEYS

United States Patent Office 3,421,604
Patented Jan. 14, 1969

3,421,604
DISC BRAKE ACTUATING PISTON ADJUSTING MEANS
Leonard James Hobbs, London, England, assignor to Morganite Carbon Limited, London, England, a corporation of the United Kingdom
Filed May 15, 1967, Ser. No. 638,481
Claims priority, application Great Britain, May 24, 1966, 23,154/66
U.S. Cl. 188—73        6 Claims
Int. Cl. F16d 55/00

ABSTRACT OF THE DISCLOSURE

The invention relates to a piston assembly for use in a disc brake system wherein the piston carries a brake pad on one end and is arranged for hydraulic pressure to be exerted on the other end. The piston is slidable within a piston housing. At least one resilient retaining member of rubber held by the housing bears against and grips the side of the piston, and at least part of the surface of the piston on which the retaining member bears is made of carbon, the high coefficient of friction between rubber and carbon substantially preventing relative sliding movement of the retaining member and the piston in use so that the piston returns to a constant rest position relative to the braking disc after application of the brakes and after any "knock-back".

---

Figure 1:
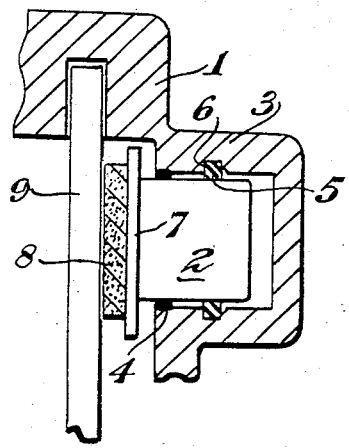

This invention is concerned with improvements in or relating to disc brakes, and is concerned in particular with the piston assemblies employed therein.

As is well known, a disc brake comprises, fundamentally, a caliper unit attached to the body of a vehicle and having at least one pair of brake pads arranged to act on a disc rigidly attached to one of the wheels and rotated thereby with the vehicle in motion. For sufficient braking power to be developed in the disc brake, a substantial pressure must be applied by the caliper unit through the brake pads on to the disc. For this to be feasible, a very high gearing is required between the brake pedal and the caliper unit, so that the force required at the brake pedal for satisfactory operation of the disc brake is kept within reasonable limits.

A disadvantage caused by this high gearing is the phenomenon known as "knock-back." The distance available for travel of the brake pedal in a vehicle is strictly limited and for this reason, and also so that the delay in applying brakes should be as short as possible, the brake pads in a disc brake should be held adjacent the disc with as little clearance as possible when the brakes are not being applied. Due to manufacturing tolerance and to distortions occurring in the disc brake assembly, especially in the disc itself as a result of the use thereof, it is found that parts of discs to which the brake pads may be applied are frequently up to 0.01 inch out of true, with the result that the brake pads are knocked back by one part of a disc on rotation thereof to a position which gives a clearance of up to 0.01 inch between the brake pad and another part of the disc at a different rotational position relative to the caliper unit. Clearances up to around this value are not considered especially harmful, and to some extent are even desirable to avoid the brake pads being permanently in contact with the disc. However, in addition to this clearance, produced by manufacturing tolerance and permanent distortion of the equipment, temporary distortions may occur in the disc brake assembly, especially on cornering of the vehicle concerned, and these may easily increase the effect of the "knock-back" to an extent where there is a clearance of 0.03 inch between the brake pad and parts of the disc. This effect is worsened where bearings in the neighbourhood of the disc brake assembly have become worn.

In disc brakes it is common to have a ratio between movement of the brake pedal and corresponding movement of the disc brake pad of 76:1. It follows that if a clearance of 0.03 inch exists between the brake pad and the disc, then the brake pedal must travel approximately 2.3 inches before contact is made between the brake pad and the disc. This means that large and violent brake pedal movements are necessary and this can be very unsettling to the driver and may well be dangerous.

It is an object of the present invention to enable disc brakes to be relatively unaffected by "knock-back" problems so that full braking action may be obtained substantially immediately force is applied to a brake pedal.

According to the present invention a piston assembly for use in a disc brake system comprises a piston slidable within a piston housing, the piston being adapted or suited to receive a brake pad on a first end thereof and the housing being adapted to receive hydraulic fluid therein so that the other end of the piston is exposed thereto, at least one resilient retaining member of rubber held rigidly in relation to the piston housing and arranged to bear against and grip the side of the piston, at least part of the surface of the piston on which the retaining member is arranged to bear being made of carbon.

In normal practice, the retaining member may be in the form of a rubber annulus acting as a sealing ring, surrounding the piston and preventing leakage of hydraulic fluid along the piston. Preferably the entire outer surface of the piston that may be contacted by the retaining member or members is of carbon, and this may most conveniently be achieved by constructing the whole piston of carbon.

Figure 2:
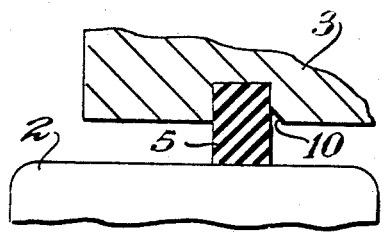
Figure 3:
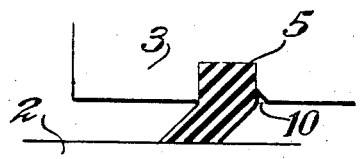
Figure 4:
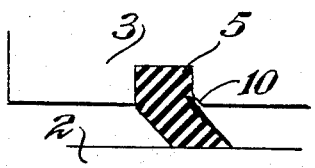

An embodiment of the invention is illustrated diagrammatically in the accompanying drawing in which FIGURE 1 is a cross-sectional view of part of a disc brake assembly showing part of the caliper unit and a part of the disc, FIGURE 2 is a cross-sectional view of the rubber retaining member of FIGURE 1 with the piston in the rest position, FIGURE 3 is a cross-sectional view of the rubber retaining member with the piston in the braking position, and FIGURE 4 is a cross-sectional view of the rubber retaining member illustrating the distortion occurring during "knock-back" of the piston.

In FIGURE 1, a caliper unit, part of which is shown generally at 1, includes a cylindrical piston 2 of carbon contained with a slight clearance largely within a coaxial cylindrical piston housing 3. The housing 3 is provided with bearing and guide means 4 for the piston, and the piston 2 is retained within the housing 3 by means of an annular retaining member 5 of rubber. This retaining member 5 is held in an annular slot 6 in the housing and has a cylindrical inner surface which bears against and grips the side of the piston. One end of the piston 2 extends out of the housing 3 and carries a plate 7, to which is attached a brake pad 8 arranged for bearing against the adjacent surface of a disc 9.

The movement of the piston is controlled hydraulically by well-known means, not shown in the drawing. Hydraulic fluid is present within the piston housing 3 around the enclosed end of the piston 2. Leakage of hydraulic fluid along the space between the piston and piston housing is prevented by the retaining member 5 which therefore acts also as a seal. It will of course be apparent that a separate seal could be provided if so desired.

In FIGURE 1, the assembly is shown in the rest position with the piston and associated brake pad ready for immediate application of the brake. In this situation the rubber retaining member 5 is undistorted, as is shown in the enlarged view of FIGURE 2, resulting in a clearance between the brake pad 8 and the disc 9 of around 0.01 inch.

On application of the brakes, the piston and brake pad are forced towards the disc 9. Owing to the high coefficient of friction between the retaining member 5 of rubber and the carbon piston 2, little or no slip occurs between them, and this, combined with the hydraulic pressure, results in distortion of the retaining member 5 as shown in FIGURE 2. This distortion is maintained so long as hydraulic pressure is applied to the closed end of the piston 2 and on release of the pressure the retaining member itself serves to return the piston 2 to the rest position with the brake pad 8 just clear of the adjacent surface of the disc 9.

As explained above, distortion of the disc brake assembly through stresses in use and which can be very substantial during cornering of the vehicle concerned, especially if the associated parts are worn, may well result in the brake pad 8 being temporarily knocked away from the disc 9 out of the rest position to give a clearance that is very substantially greater. When this happens, the retaining member 5 is again distorted as shown in FIGURE 4, though this time in the opposite direction to that occurring during application of the brakes, but no slip occurs between it and the piston 2, on account of the high coefficient of friction between them. Accordingly as soon as the conditions causing the temporary "knock-back" are removed, the distorted retaining member 5 serves to return the piston 2 with the brake pad 8 to the rest position of FIGURES 1 and 2.

It has been found desirable to permit a greater extent of movement of the piston 2 from the rest position of FIGURES 1 and 2 during knock-back than is needed for application of the brakes. This is conveniently achieved by providing the slot 6 with a chamfered edge 10 on the side remote from the plate 7 and brake pad 8. Thus the retaining member 5 is able to flex to a greater extent when distorted as shown in FIGURE 4 than when distorted as shown in FIGURE 3, and the travel of the piston 2 is correspondingly affected.

In the prior art, the piston 2 is normally made of steel, and the rubber member 5 serves as a seal for the hydraulic fluid. However, because of the comparatively low coefficient of friction between the steel piston and the rubber, distortion of the rubber member during brake application takes place to only a limited degree before the piston begins to slip through it. Consequently in the prior art the member 5 plays only a small part either in returning the piston and brake pad from the braking position or, more especially, in returning them from a "knock-back" position where there is a large clearance between the brake pad 8 and the disc 9. Thus, when "knock-back" has occurred due to some temporary stressing of the disc brake assembly there is a dangerously large separation of the brake pad from the disc and on the next operation of the brake pedal this must travel a substantial distance before the brake pad is in fact applied to the disc. As indicated above, this is most undesirable, and the situation will be repeated every time cornering or other situation involving temporary stressing of the disc brake assembly knocks back the brake pad. It will thus be seen that when the piston assembly of the present invention is employed substantially more reliable operation of disc brakes may be achieved.

What is claimed is:

1. A piston assembly for use in a disc brake system comprising a piston housing, a piston slidable within the piston housing, the piston being capable of receiving a brake pad on a first end thereof and having a second end opposite said first end and forming with the housing one wall of a chamber to receive hydraulic fluid, at least one resilient retaining member of rubber held rigidly in relation to the piston housing and arranged to bear against and grip the side of the piston, at least that part of the surface of the piston on which the retaining member is arranged to bear being made entirely of carbon.

2. A piston assembly according to claim 1 wherein the retaining member is held in a recess in the interior of the housing, the edge of the recess remote from the said first end of the piston being chamfered, whereby the retaining member is capable of a greater extent of movement relative to the undistorted position away from the first end of the piston than away from the second end.

3. A piston assembly according to claim 1 wherein the complete outer surface of the piston is made entirely of carbon.

4. A piston assembly according to claim 1 wherein the resilient retaining member is an annulus of rubber.

5. A piston assembly according to claim 4 wherein the annulus has a cylindrical inner surface arranged to bear against and grip the side of the piston, and has a pair of side walls on either side of said cylindrical surface and lying in parallel planes perpendicular thereto when the annulus is in the undistorted position.

6. A disc brake system comprising a braking disc rotatable about an axis perpendicular to its plane and a caliper unit, the caliper unit comprising at least one pair of brake pads arranged to act on the disc for braking the same, a pair of pistons, one of said brake pads being mounted on a first end of each piston, a pair of piston housings, one of said pistons being slidably mounted in each, each piston having a second end opposite said first end and forming with its respective housing one wall of a chamber to receive hydraulic fluid, at least one resilient member of rubber being held rigidly in relation to each piston housing and arranged to bear against and grip the side of the piston mounted therein, at least that part of the surface of each piston on which each of the retaining members is arranged to bear being made entirely of carbon.

References Cited

UNITED STATES PATENTS

| | | | |
|---|---|---|---|
| 2,095,805 | 10/1937 | Frank | 188—251 |
| 2,361,031 | 10/1944 | Hood | 188—251 |
| 2,938,609 | 5/1960 | Burnett | 188—196 |
| 3,199,635 | 8/1965 | Bessler et al. | 188—196 |
| 3,243,017 | 3/1966 | Kleinstuck | 188—196 |

GEORGE E. A. HALVOSA, *Primary Examiner.*

U.S. Cl. X.R.

188—196; 192—111; 92—168, 212, 222, 223